UNITED STATES PATENT OFFICE.

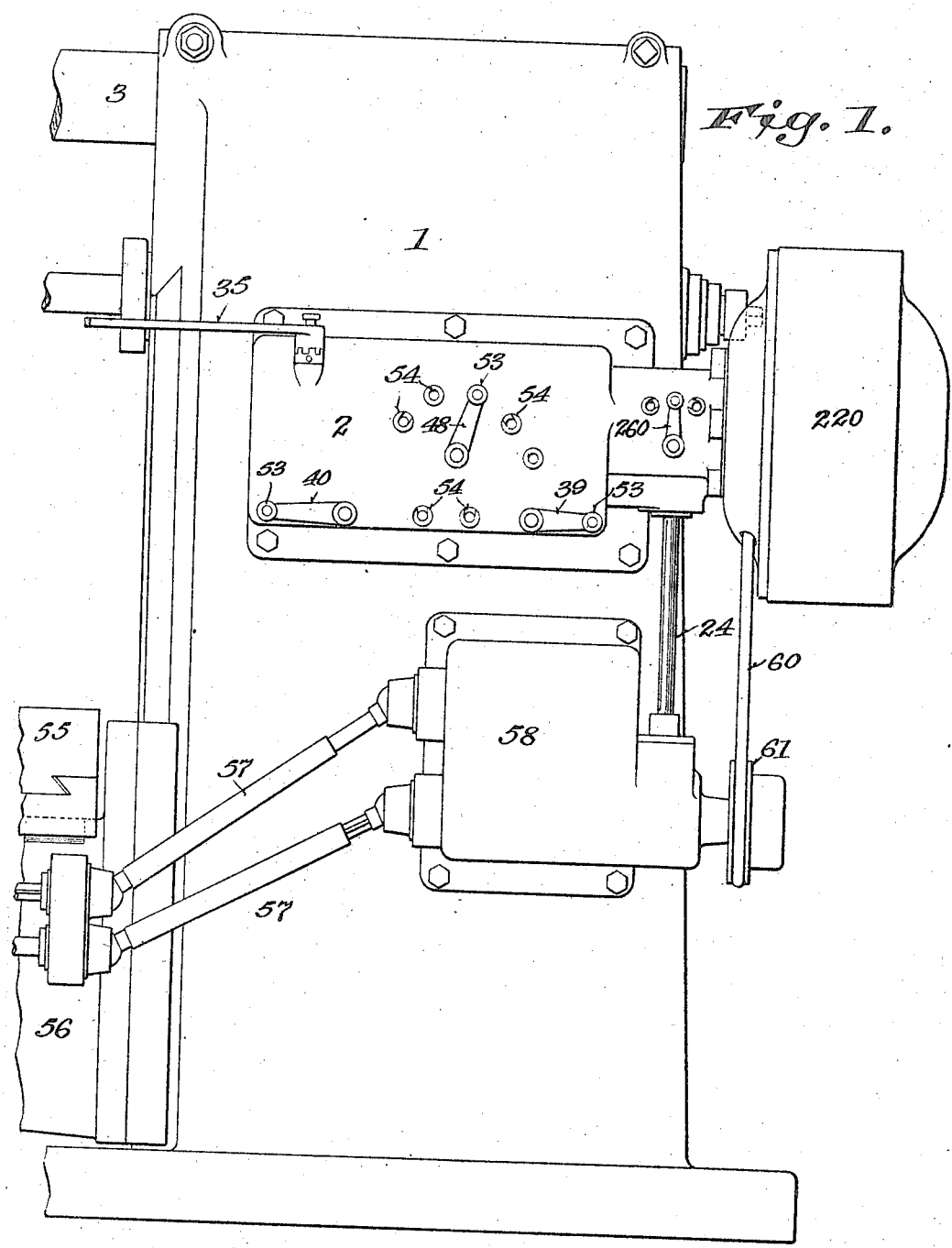

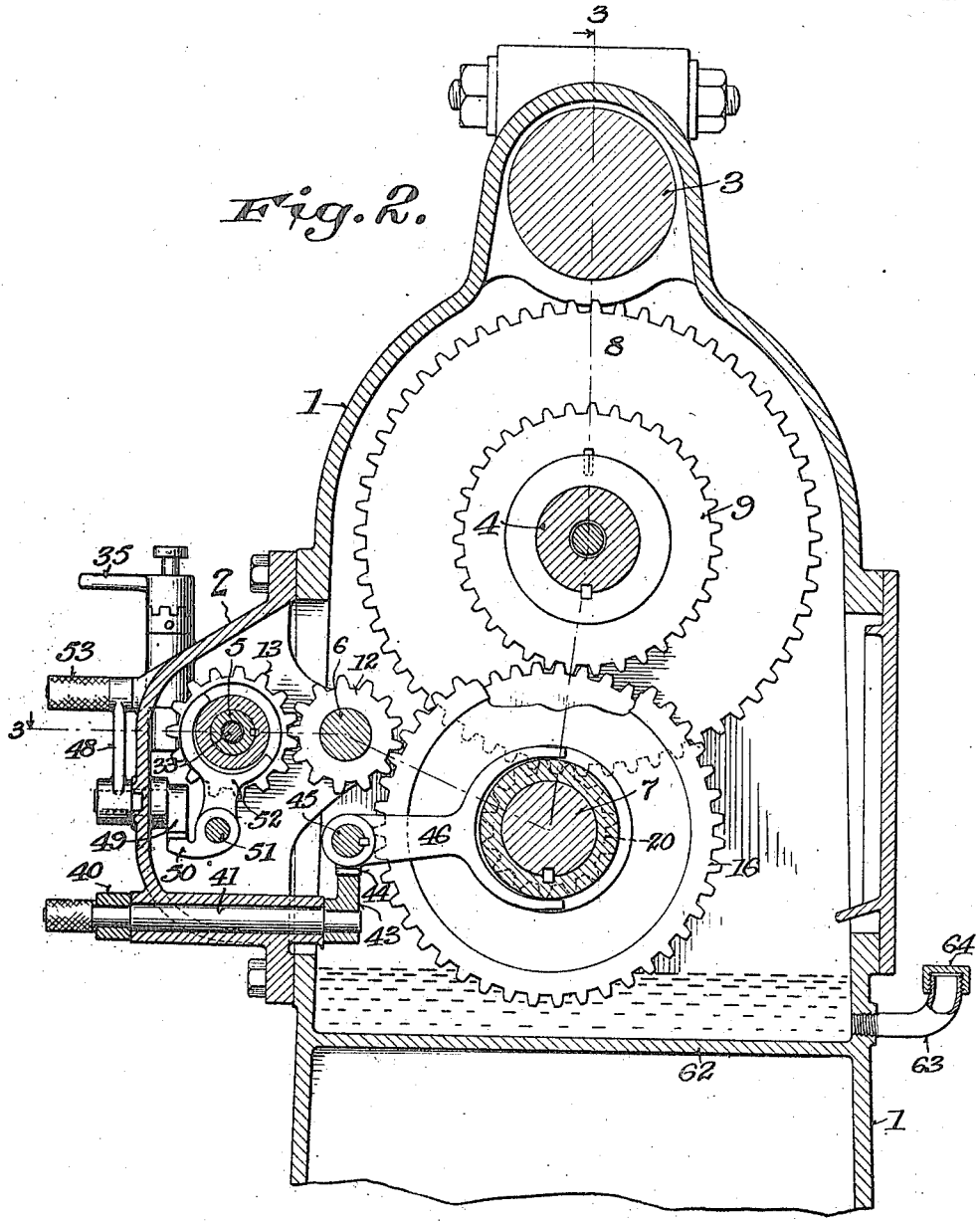

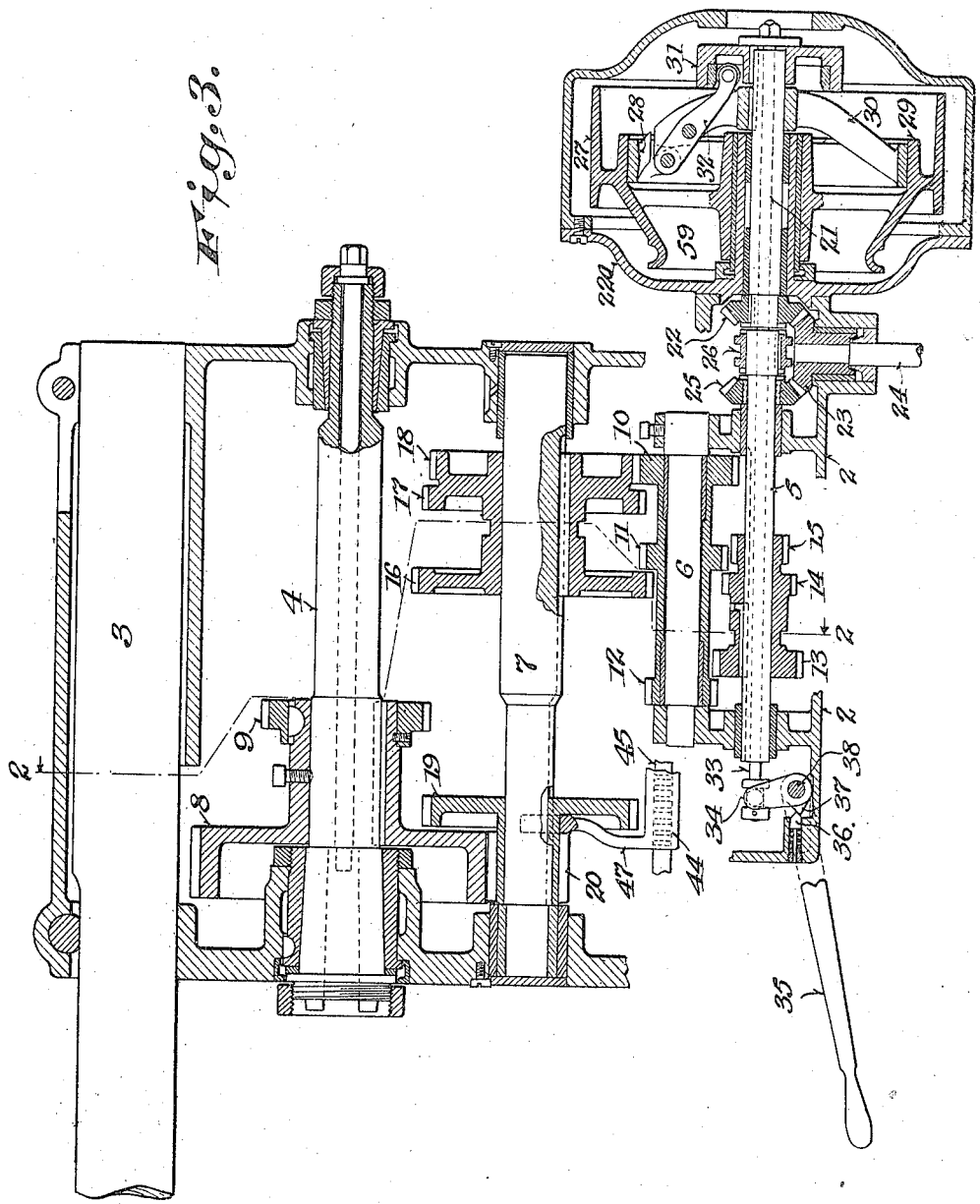

FRED A. PARSONS, OF MILWAUKEE, WISCONSIN, ASSIGNOR TO THE KEMPSMITH MANUFACTURING CO., OF WEST ALLIS, WISCONSIN, A CORPORATION OF WISCONSIN.

TRANSMISSION-GEARING FOR MILLING-MACHINES.

1,233,500.　　　　　Specification of Letters Patent.　　Patented July 17, 1917.

Application filed July 31, 1916. Serial No. 112,208.

*To all whom it may concern:*

Be it known that I, FRED A. PARSONS, a citizen of the United States, residing at Milwaukee, in the county of Milwaukee and State of Wisconsin, have invented certain new and useful Improvements in Transmission-Gearing for Milling-Machines, of which the following is a specification, reference being had to the accompanying drawing, forming a part thereof.

This invention relates in part and more particularly to variable speed transmission gearing of the sliding gear type.

The main objects of the invention are to obtain a maximum number of speed variations with a minimum number of gears; to obtain such speed variations without the use of clutches, thereby avoiding the noise of intermeshing gears running idly, and without the use of tumblers, thereby avoiding the difficulty of holding the tumblers rigidly in working position and the vibration incident to their use; to provide an arrangement whereby a minimum number of gears are engaged for any given speed and no more are engaged for low speeds than high speeds, thus tending to secure equally high efficiency for all speeds; and generally to simplify and improve the construction and operation of speed changing mechanism of this class.

It consists in the construction, arrangement and combination of parts as hereinafter particularly described and pointed out in the claims.

In the accompanying drawing like characters designate the same parts in the several figures.

Figure 1 is a front elevation of a milling machine embodying the invention; Fig. 2 is an enlarged vertical section of the upper part thereof on the broken line 2—2, Fig. 3; and Fig. 3 is a developed section generally indicated by the broken line 3—3, Fig. 2, of the train of gearing for driving the spindle at different speeds.

The machine comprises a box frame or hollow column 1, similar in general construction to those employed in machines of this class. It is provided on one side with a gear case 2, which opens into the interior thereof and forms therewith a housing for the variable speed train of gearing which drives the spindle. In the upper part of the column an overarm 3 is mounted, and below and parallel therewith, the tool spindle 4. A driving shaft 5 is mounted parallel with the spindle 4 in the gear case 2, and parallel therewith a first intermediate shaft 6 is mounted in bearings which may be formed as shown, with said gear case. Below and parallel with the spindle 4, a second intermediate shaft 7 is mounted in the column 1. The spindle 4 is provided with a cone or series of gears 8 and 9 fixed thereon. An axially stationary cone or series of connected gears 10, 11 and 12, is revolubly mounted on the first intermediate shaft 6. A cone or series of connected gears 13, 14 and 15 is feathered or otherwise mounted on the driving shaft 5, so as to rotate therewith, and be axially shiftable into engagement one at a time with the gears on the shaft 6. A first cone or series of connected gears 16, 17 and 18, is feathered or otherwise mounted on the second intermediate shaft 7, so as to rotate therewith and be shiftable axially into engagement one at a time with the gears on the shaft 6. A second cone or series of connected gears 19 and 20, is also feathered or otherwise mounted on the shaft 7 so as to rotate therewith and be axially shiftable into engagement one at a time with the gears on the spindle 4. With these four shafts, including the tool spindle, and thirteen gears, the spindle may be driven at eighteen different speeds from a power shaft or prime mover having a constant speed.

As shown in Fig. 3, the power shaft 21 with which a prime mover such as an electric motor may be directly or indirectly connected, is mounted in a case or housing 220, in alinement with the driving shaft 5 of the primary gear train through which the spindle is rotated. The shaft 21 is provided with a fixed bevel gear 22, meshing with a similar gear 23 on the upper end of a vertical shaft 24. The gear 23 meshes with a similar gear 25, loosely mounted on the shaft 5. A clutch collar 26, feathered or otherwise mounted on the shaft 5 so as to turn therewith, but be movable lengthwise thereof, into engagement with clutch members on the hubs of the gears 22 and 25, affords means for connecting the shaft 5 either directly with the power shaft 21, or indirectly and reversibly through the constantly intermeshing gears 22, 23 and 25. In its middle position, as shown in Fig. 3, the clutch collar 26 clears the clutch members on both gears 22 and 25, and the shaft 5 is not operatively connected with the power shaft 21. Any suitable means, such as a crank arm or lever 260, shown in Fig. 1, may be provided for shifting the clutch collar and holding it in its different positions.

In the present case a belt pulley 27, representing the prime mover, is rotatably mounted on the bearing in which the shaft 21 is supported, and is operatively connected with said shaft by a friction clutch comprising an expansible band or shoe 28, carried within a friction rim 29 on the pulley by a spider 30, which is fixed on the shaft 21. An internally beveled collar or ring 31, mounted and axially shiftable on the shaft 21, is adapted by engagement with a lever 32 fulcrumed on the spider 30, to expand the band or shoe 28 within the rim 29 when said collar or ring is shifted to the left. The collar or ring 31 is connected by a rod 33, passing loosely and axially through the shafts 21 and 5, with a forked arm 34 of a lever 35, pivotally mounted on the gear case 2 within easy reach of the operator.

As shown in Fig. 3, a spring actuated V-shaped detent or plunger 36, mounted in the gear case 2, by engagement with a V-shaped lug on the hub of the arm 34, tends to throw said arm to and hold it in either of its extreme positions when the lever 35 is shifted in either direction past its central position. The hub of the lever 35, which is keyed or feathered and shiftable axially on the vertical shaft 38 connecting it with the arm 34, is formed with teeth, which by engagement with a correspondingly toothed collar fixed on the shaft 38, enables the lever to be adjusted to different angular relations to said shaft most convenient for its manipulation by the operator standing in different positions.

The first and second cones or series of gears on the intermediate shafts 7, are shifted and locked in place thereon by cranks 39 and 40, pivotally mounted on the front wall of the gear case 2, as shown in Fig. 1. The shafts 41 of these cranks, passing horizontally through and having bearings in the gear case, are provided at their inner ends with pinions 43, which mesh on their upper sides with racks 44, mounted and guided on a fixed rod 45, extending through and fixed at its ends to the column 1, parallel with the shaft 7. One of these racks is provided with a forked arm 46, which engages with a groove in the sleeve or hub of the gears 16, 17 and 18, as shown in Fig. 2. The other rack 44, is formed or provided with an arm 47, which engages with a groove in the sleeve or hub of the gears 19 and 20, as shown in Fig. 3.

The cone or series of connected gears 13, 14 and 15, on the driving shaft 5, is shifted and locked in different positions by a crank 48, also mounted on the front wall of the gear case 2, and connected by a short horizontal shaft passing through and having a bearing in said case with a pinion 49, meshing on its under sides with a rack 50, guided on a rod 51, fixed at its ends in said case parallel with the shaft 5. The rack 50 is formed or provided with a forked arm 52, engaging a groove in the sleeve or hub of the gears 13, 14 and 15, as shown in Fig. 2. The handles 53 of the several cranks are movably connected therewith and are provided in the usual manner with spring actuated locking pins (not shown) which by engagement with sockets 54, provided therefor in the gear case 2, hold the shiftable cones or series of gears in their different positions.

By the construction and arrangement of the gears and shafts of the primary train for driving the spindle 4 and the connections for shifting the axially movable gears of the train, as herein shown and described, the movement of the cranks 39, 40 and 48, in one and the same direction, for example, to the right, as shown in Fig. 1, has the effect of increasing the speed of the spindle, while movement in the opposite direction has the effect of reducing the speed of the spindle, thereby tending to avoid confusion in the mind of the operator and consequent mistakes and accidents.

A work table 55, mounted and movable horizontally in directions transverse to each other on a knee 56, which is guided and movable vertically on the column 1, as usual in machines of this class, is connected with the power shaft 21 or prime mover, by secondary trains of gearing comprising extensible jointed shafts 57, and gears inclosed in a box or case 58 attached to the column 1 below the gear case 2. One of these secondary trains, comprising the upper shaft 57, is a variable slow speed drive, and is connected with the power shaft 21 through the bevel gears 22 and 23 and the vertical shaft 24. The other secondary train, comprising the lower shaft 57, is a non-variable high speed drive for quickly shifting the table 55 from one position to another, and is connected with the power shaft 21 by a grooved rim 59 on the pulley 27, a belt 60 and a grooved pulley 61, as shown in Figs. 1 and 3.

By this arrangement of the primary and secondary trains of gearing with relation to one another and to the prime mover or power shaft 21, the bevel gear 23 through which the low speed feed drive of the table 55 is connected with the power shaft 21, also serves to reversibly connect the driving shaft 5 of the primary gear train with the power shaft in such a manner as not to interfere with the automatic lubrication of the primary gear train by the action of the lower gears of said train in connection with special provision therefor in the structure of the column, which is provided, as shown in Fig. 2, with a transverse partition 62, forming an oil receptacle into which the lower sides of the gears on the lower intermediate shaft 7 are adapted to dip. This oil receptacle is filled to the desired level, as indicated in Fig. 2, by means of an elbow-shaped funnel or tube 63, provided with a removable cap or closure 64. No claim however, is made herein to the means shown for lubricating the gearing, as this is made the subject matter of another application.

Various changes in the details of construction and arrangement of parts of the machine may be made without departure from the principle and scope of the invention as defined in the following claims.

I claim:

1. In transmission gearing for milling machines the combination of a spindle, a driving shaft, first and second intermediate shafts parallel with the spindle and driving shaft, an axially stationary cone of gears on the first intermediate shaft, a cone of gears axially shiftable on the driving shaft into engagement one at a time with the gears on the first intermediate shaft, an axially stationary cone of gears on the spindle, a first cone of gears axially shiftable on the second intermediate shaft into engagement one at a time with the gears on the first intermediate shaft, and a second cone of gears axially shiftable on the second intermediate shaft into engagement one at a time with the gears on the spindle.

2. In transmission gearing for milling machines the combination of a spindle, a driving shaft, first and second intermediate shafts parallel with the spindle and driving shaft, an axially stationary cone of gears on the first intermediate shaft, a cone of gears axially shiftable on the driving shaft into engagement one at a time with the gears on the first intermediate shaft, an axially stationary cone of gears on the spindle, a first cone of gears axially shiftable on the second intermediate shaft into engagement one at a time with the gears on the first intermediate shaft, a second cone of gears axially shiftable on the second intermediate shaft into engagement one at a time with the gears on the spindle, the larger gears of the first and second cones on the second intermediate shaft being located at opposite ends of the cones, and the larger gears of the cones on the spindle and driving shaft being located at corresponding ends thereof, and means for adjusting the axially shiftable cones independently of one another movable in the same direction for increasing the speed and in the opposite direction for reducing the speed of the spindle.

3. In transmission gearing for milling machines the combination of a spindle, a driving shaft, first and second intermediate shafts parallel with the spindle and driving shaft, an axially stationary cone of gears on the first intermediate shaft, a cone of gears axially shiftable on the driving shaft into engagement one at a time with the gears on the first intermediate shaft, an axially stationary cone of gears on the spindle, a first cone of gears axially shiftable on the second intermediate shaft into engagement one at a time with the gears on the first intermediate shaft, a second cone of gears axially shiftable on the second intermediate shaft into engagement one at a time with the gears on the spindle, and means movable in the same direction for shifting the several cones of gears independently of one another to increase the speed and in the reverse direction to reduce the speed of the spindle.

4. In a transmission gearing for milling machines the combination of a spindle, a driving shaft, first and second intermediate shafts parallel therewith, an axially stationary cone of gears on the spindle, an axially stationary cone of gears on the first intermediate shaft, a cone of gears axially shiftable on the driving shaft into engagement one at a time with the gears on the first intermediate shaft, a first cone of gears axially shiftable on the second intermediate shaft into engagement one at a time with the gears on the first intermediate shaft, a second cone of gears axially shiftable on the second intermediate shaft into engagement one at a time with the gears on the spindle, and cranks connected by racks and pinions with the shiftable cones of gears, the cranks, gears and their connections being so arranged that movement of the cranks in one and the same direction will increase the speed and in the opposite direction reduce the speed of the spindle.

5. In transmission gearing for milling machines the combination of a spindle, a driving shaft, first and second intermediate shafts parallel therewith, an axially stationary cone of gears on the spindle, an axially stationary cone of gears on the first intermediate shaft, a cone of gears axially shiftable on the driving shaft into engagement one at a time with the gears on the first intermediate shaft, a first cone of gears axially shiftable on the second intermediate shaft into engagement one at a time with the gears on the first intermediate shaft, a second cone of gears axially shiftable on the second intermediate shaft into engagement one at a time with the gears on the spindle, the larger gears of the cones on the second intermediate shaft being at opposite ends of the cones, racks connected with the shiftable cones and parallel with their shafts, and cranks provided with pinions meshing with said racks, the pinions associated with the cones on the second intermediate shaft being located on the same side of their racks and the pinion associated with the cone on the driving shaft being located on the opposite side of its rack.

6. In transmission gearing for milling machines the combination with a hollow column, of a tool spindle having bearings in the upper part of said column, a train of gearing inclosed and having bearings in said column and comprising a driving shaft and first and second intermediate shafts parallel with the spindle, a cone of axially stationary gears on the spindle, a cone of axially stationary gears on the first intermediate shaft, a cone of gears axially shiftable on the driving shaft into engagement one at a time with the gears on the first intermediate shaft, a second cone of gears axially shiftable on the second intermediate shaft into engagement one at a time with the gears on the spindle, a power shaft axially alined with the driving shaft and provided with a fixed bevel gear, a bevel gear loosely mounted on the driving shaft, an intermediate bevel gear having its axis at right angles to the driving shaft and meshing with the bevel gears on the power and driving shafts, and a clutch adapted to connect the driving and power shafts directly with each other or indirectly and reversibly through said bevel gears.

7. In transmission gearing for milling machines the combination with a hollow column, of a tool spindle having bearings in the upper part of the column, a train of gearing inclosed and having bearings in said column and comprising a driving shaft and first and second intermediate shafts parallel with the spindle, a cone of axially stationary gears on the spindle, a cone of axially stationary gears on the first intermediate shaft, a cone of gears axially shiftable on the driving shaft into engagement one at a time with the gears on the first intermediate shaft, a first cone of gears axially shiftable on the second intermediate shaft into engagement one at a time with the gears on the first intermediate shaft, a second cone of gears axially shiftable on the second intermediate shaft into engagement one at a time with the gears on the spindle, a power shaft axially alined with the driving shaft and provided with a fixed bevel gear, a bevel gear loosely mounted on the driving shaft, an intermediate bevel gear having its axis at right angles to the driving shaft and meshing with the bevel gears on the power and driving shafts, a clutch adapted to connect the driving and power shafts directly with each other or indirectly and reversibly through said bevel gears, a prime mover, a clutch for connecting the prime mover with the power shaft, and a lever for operating said clutch connected therewith by a rod passing axially through the driving and power shafts.

In witness whereof I hereto affix my signature in presence of two witnesses.

FRED A. PARSONS.

Witnesses:
 CHAS. L. GOSS,
 ALICE E. GOSS.